United States Patent
Mendel

(10) Patent No.: US 9,772,649 B1
(45) Date of Patent: Sep. 26, 2017

(54) LOW-SKEW CHANNEL BONDING USING OVERSAMPLING

(71) Applicant: ALTERA CORPORATION, San Jose, CA (US)

(72) Inventor: David W. Mendel, Sunnyvale, CA (US)

(73) Assignee: Altera Corporation, San Jose, CA (US)

(*) Notice: Subject to any disclaimer, the term of this patent is extended or adjusted under 35 U.S.C. 154(b) by 291 days.

(21) Appl. No.: 14/724,166

(22) Filed: May 28, 2015

(51) Int. Cl.
  *G06F 1/10* (2006.01)
  *G06F 13/40* (2006.01)
  *G06F 13/16* (2006.01)

(52) U.S. Cl.
  CPC .............. *G06F 1/10* (2013.01); *G06F 13/161* (2013.01); *G06F 13/4022* (2013.01)

(58) Field of Classification Search
  CPC ....... G06F 1/10; G06F 13/161; G06F 13/4022
  See application file for complete search history.

(56) References Cited

U.S. PATENT DOCUMENTS

| | | | |
|---|---|---|---|
| 7,908,528 B1* | 3/2011 | Turudic | H03K 5/131 |
| | | | 714/700 |
| 2009/0161738 A1* | 6/2009 | Carvalho | H04L 25/14 |
| | | | 375/219 |
| 2011/0083054 A1* | 4/2011 | Ozdemir | G11B 20/1403 |
| | | | 714/752 |
| 2012/0198264 A1* | 8/2012 | DeMarco | G06F 1/10 |
| | | | 713/401 |

FOREIGN PATENT DOCUMENTS

EP 1050986 A2 * 11/2000 ............ H04J 3/0608

OTHER PUBLICATIONS

IEEE Standard for a Precision Clock Synchronization Protocol for Networked Measurement and Control Systems, Jul. 24, 2008, 289 pages, IEEE Std 1588-2008 (Revision of IEEE Std 1588-2002).
Pedro Moreira, et al. "White Rabbit: Sub-Nanosecond Timing Distribution over Ethernet", Oct. 12-16, 2009, pp. 58-62, ISPCS 2009 International IEEE Symposium on Precision Clock Syncronization for Measurement, Control and Communication, Brescia, Italy.
Altera—CPRI MegaCore Function User Guide, Jun. 2012, 11 pages, Altera Corporation, San Jose, CA.

(Continued)

*Primary Examiner* — Glenn A Auve
(74) *Attorney, Agent, or Firm* — Okamoto & Benedicto LLP

(57) ABSTRACT

In accordance with an embodiment of the invention, higher-speed outgoing data paths are used to transmit oversampled data signals, and corresponding slower-speed return data paths are used to receive return data signals. A channel-bonding control circuit measures the skew between the returned data signals and generates bit-slip and/or word-slip control signals to compensate for the skew. Transmission bit-slip (or, alternatively, clock-slip) circuits slip integer numbers of bits based on the bit-slip control signals. Bypass registers (or, alternatively, FIFO write or read enable signals) may be used to slip a whole word when the integer number of bits to slip is greater or equal to the parallel width of a lane. Various other aspects, features, and embodiments are also disclosed.

20 Claims, 9 Drawing Sheets

(56) References Cited

OTHER PUBLICATIONS

IEEE std. 802.3ba-2010 (Amendment to IEEEStd 802.3-2008), Amendment 4: Media Access Control Parameters, Physical Layers, and Management Parameters for 40 Gb/s and 100 Gb/s Operation, Jun. 22, 2010, 457 pgs.
M Gustlin, P Anslow, and D Giannakopoulos, 100GE/40GE skew budget, Nov. 2008, 21 pgs., IEEE 802.3ba TF.
Gary Nicholl, 100GE and 40GE PCS Overview, Nov. 2008, 27 pgs., IEEE 802.3az Energy Efficient Ethernet Task Force public area.
Arria V Device Handbook, vol. 2: Transceivers, AV-5V3 Sep. 30, 2014, 8 pgs., Altera Corporation.

\* cited by examiner

LOW-SKEW CHANNEL BONDING USING OVERSAMPLING

BACKGROUND

Technical Field

The present invention relates generally to data communication circuits, including serial interface circuits.

Description of the Background Art

High speed serial interface (HSSI) bonding is required for many protocols that require low channel-to-channel skew. Such protocols typically limit skew to a few unit intervals (UI) or less between transmission pins on an integrated circuit.

Implementing HSSI bonding with low skew becomes more challenging at higher data rates. One reason is that conventional techniques for HSSI bonding tend to introduce additional jitter.

SUMMARY

Disclosed are methods, circuits, and systems that use oversampling for low-skew bonding of a plurality of data channels into a multi-lane data channel.

In accordance with an embodiment of the invention, higher-speed outgoing data paths are used to transmit oversampled data signals, and corresponding slower-speed return data paths are used to receive return data signals. A channel-bonding control circuit measures the skew between the returned data signals and generates bit-slip and/or word-slip control signals to compensate for the skew. Transmission bit-slip (or, alternatively, clock-slip) circuits slip integer numbers of bits based on the bit-slip control signals. Bypass registers (or, alternatively, FIFO write or read enable signals) may be used to slip a whole word when the integer number of bits to slip is greater or equal to the parallel width of a lane.

Various other aspects, features, and embodiments are also disclosed.

DETAILED DESCRIPTION

Previous techniques to address channel-to-channel transmission skew focus on making adjustments using analog circuitry in the physical media attachment (PMA) or serializer circuits. For example, such previous techniques may make adjustments to reduce skew using distributed clocks, distributed resets, and alignment of phase-locked loops (PLLs).

The present disclosure provides methods and apparatus which achieve low-skew channel bonding using oversampling. Adjustments are made using bit-slips at the transmitter.

Advantageously, the presently-disclosed technique does not add jitter and scales well to higher frequencies. The presently-disclosed technique also supports bonding across non-adjacent channels. The channels being bonded may be on a same integrated circuit device, or on different integrated circuit devices.

Figure 1:
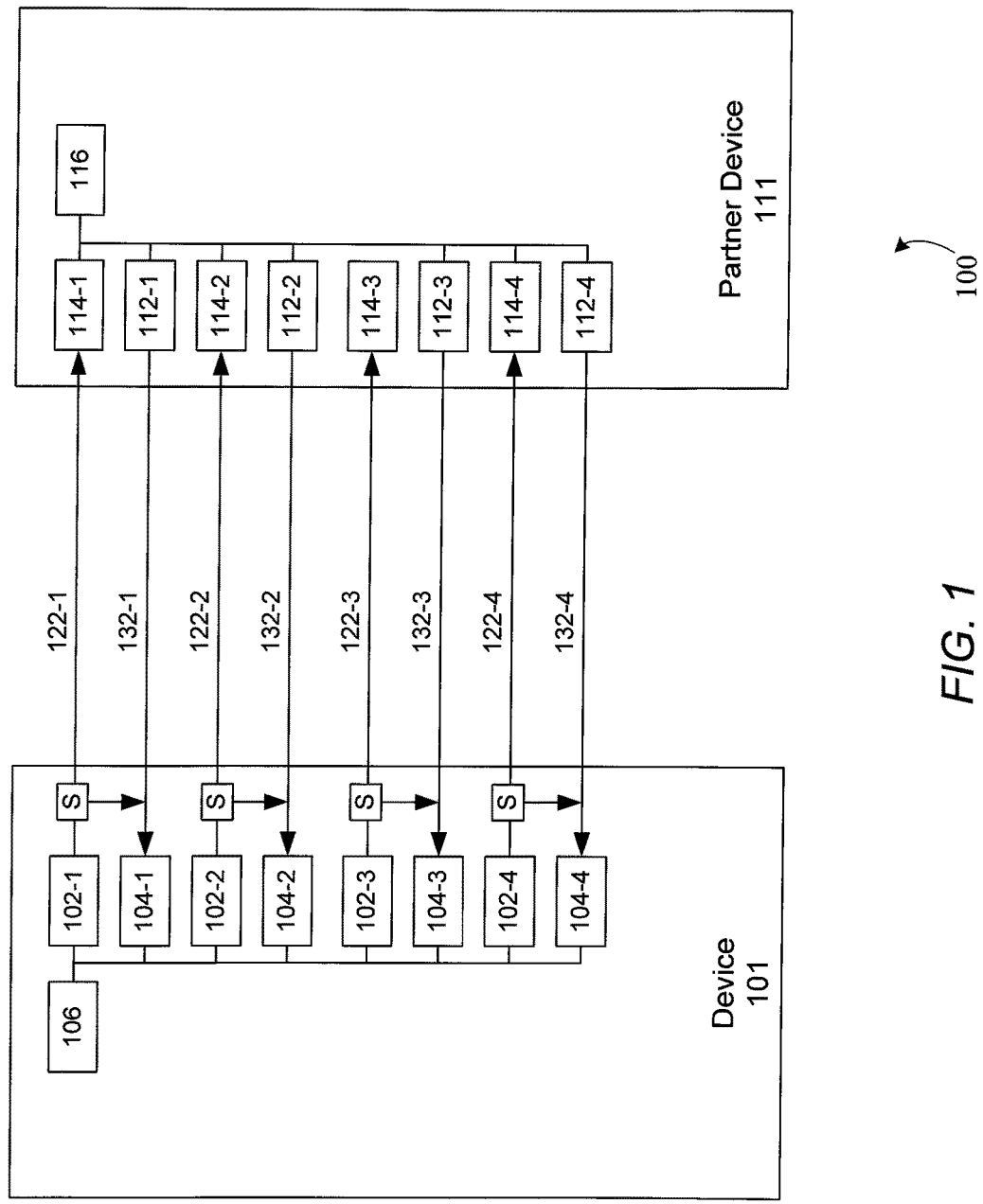
FIG. 1 is a high-level diagram of an exemplary circuit apparatus for low-skew channel bonding in accordance with an embodiment of the present invention.

FIG. 1 is a high-level diagram of an exemplary circuit apparatus 100 for low-skew channel bonding in accordance with an embodiment of the present invention. The circuit apparatus 100 depicted in FIG. 1 forms a bidirectional multi-lane point-to-point link between two devices: a first device 101 and a second (partner) device 111. In an exemplary implementation, each device (101 and 111) may be an integrated circuit (IC) with a high-speed serial interface. In a particular implementation, the IC may be a field programmable gate array (FPGA).

In the depicted example, the bidirectional multi-lane link has four lanes in each direction: four outgoing lanes 122-1, 122-2, 122-3 and 122-4 communicating data from the first transceiver 101 to the second transceiver 111; and four incoming lanes 132-1, 132-2, 132-3 and 132-4 communicating data from the second transceiver 111 to the first transceiver 101. It is contemplated that other numbers of lanes may be implemented. More generally, the multi-lane bidirectional link may have N bidirectional lanes, where N is an integer that is two or more. Also, while the lanes to be bonded are shown as adjacent to each other on each of the two devices, non-adjacent lanes may also be bonded in accordance with an embodiment of the invention.

In the exemplary embodiment depicted in FIG. 1, four bidirectional lanes are shown:

a first bidirectional lane that includes (i) a first outgoing lane 122-1 from a first transmitter circuit 102-1 of the first device 101 to a first receiver circuit 114-1 of the second device 111 and (ii) a first incoming lane 132-1 from a first transmitter circuit 112-1 of the second device 111 to a first receiver circuit 104-1 of the first device 101;

a second bidirectional lane that includes (i) a second outgoing lane 122-2 from a second transmitter circuit 102-2 of the first device 101 to a second receiver circuit 114-2 of the second device 111 and (ii) a second incoming lane 132-2 from a second transmitter circuit 112-2 of the second device 111 to a second receiver circuit 104-2 of the first device 101;

a third bidirectional lane that includes (i) a third outgoing lane 122-3 from a third transmitter circuit 102-3 of the first device 101 to a third receiver circuit 114-3 of the second device 111 and (ii) a third incoming lane 132-3 from a third transmitter circuit 112-3 of the second device 111 to a third receiver circuit 104-3 of the first device 101; and a fourth bidirectional lane includes (i) a fourth outgoing lane 122-4 from a fourth transmitter circuit 102-4 of the first device 101 to a fourth receiver circuit 114-4 of the second device 111 and (ii) a fourth incoming lane 132-4 from a fourth transmitter circuit 112-4 of the second device 111 to a fourth receiver circuit 104-4 of the first device 101.

In accordance with an embodiment of the invention, a bonding control circuit 106 may be communicatively connected to the four transmitter circuits (102-1, 102-2, 102-3, and 102-4) and the four receiver circuits (104-1, 104-2, 104-3, and 104-4) of the first device 101. In further accordance with an embodiment of the invention, the first device 101 includes a plurality of loopback paths connecting the output of each transmitter circuit to the input of a corresponding receiver circuit. Switches (S) are used to control whether the output is transmitted out to the second device 111 (transmit mode) or looped back in to the first device 101 (loopback mode). The switches (S) may be controlled by the bonding control circuit 106.

Figure 2:
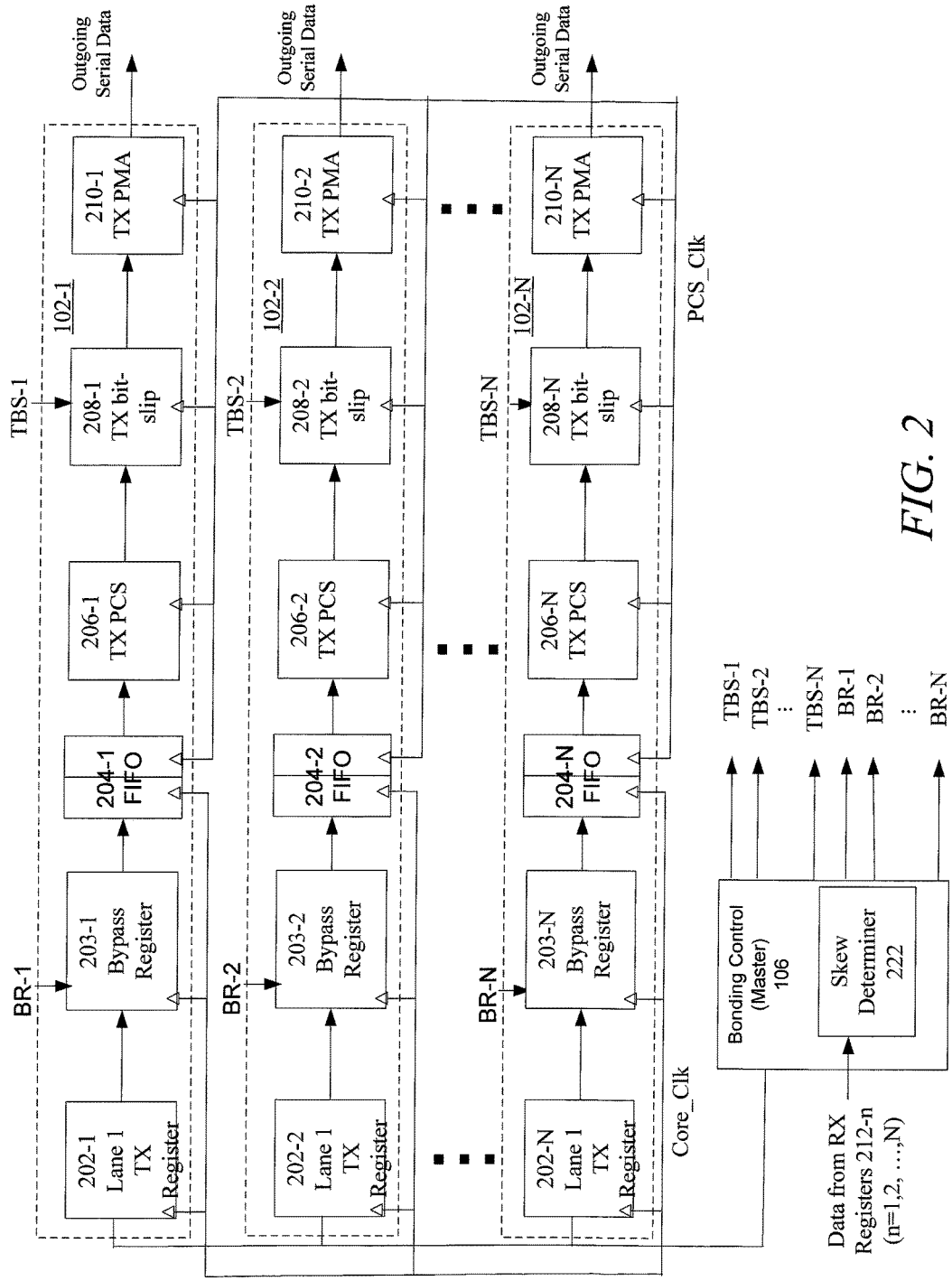
FIG. 2 depicts multiple data transmit circuits at a first device in accordance with an embodiment of the invention.

FIG. 2 depicts exemplary data transmit circuits (102-1, 102-2, ..., 102-N) at the first device 101 in accordance with an embodiment of the invention. As shown, each transmit circuit 102-n may include: zero or more core transmit registers (Lane n TX Register) 202-n; a bypass register 203-n; a dual-clock first-in first-out (FIFO) buffer circuit 204-n, a transmit Physical Coding Sublayer (TX PCS) circuit (also referred to herein as an "encoder" circuit) 206-n, a TX bit-slip delay circuit 208-n, and a TX Physical Media Attachment (PMA) circuit (also referred to herein as a "serializer" circuit) 210-n. (Note that the FIFO could in principal have more than one cycle of non-determinism. In such a case, more than one core transmit register is desirable.)

Two clock domains (Core_Clk and PCS_Clk) are depicted. In this embodiment, the Core_Clk clock signal is provided to the core TX registers 202-n, the bypass registers 203-n, and the dual-clock FIFO buffers 204-n, and the PCS_Clk clock signal is provided to the dual-clock FIFO buffers 204-n, the TX PCS circuits 206-n, the TX bit-slip delay circuits 208-n, and the TX PMA circuits 210-n.

As depicted, a core TX register (Lane n TX Register 202-n) in the core circuitry for each lane n provides input data for transmission via the TX PCS and TX PMA circuitry for that lane. The input data may be a word stream at a timing controlled by a first clock signal (Core_Clk) which may be from the core of the integrated circuit. Typical bit-widths for the word stream are: 8, 10, 16, 20, 32, 40 and 64.

The input data for transmission via lane n is provided to the corresponding bypass register circuit 203-n and then to the corresponding FIFO buffer circuit 204-n. The bypass register circuit 203-n may be implemented with one (or more) bypassable register to provide a controllable delay of one (or more) parallel clock cycle, or it may be controllably bypassed so as to not provide such a delay.

As depicted, Core_Clk provides timing for a write section of each FIFO buffer circuit 204-n. In other words, Core_Clk is the write clock for each of the FIFO buffer circuits 204-n (n=1, 2, ..., N).

As further depicted, a second clock signal (PCS_Clk) is used by the physical coding sublayer (PCS) circuits 206-n.

The PCS_Clk signal also provides timing for the read section of each FIFO buffer circuit 204-n. In other words, PCS_Clk is the read clock for each of the FIFO buffer circuits 204-n (n=1, 2, ..., N). In addition, the PCS_Clk signal also provides a clock for the transmission (TX) bit-slip circuits 208-n and the physical media attachment (PMA) circuits 210-n.

As shown in FIG. 1, the TX bit-slip delay circuit 208-n for each channel n may be positioned between the PCS circuitry 206-n and the TX PMA circuitry 210-n. The TX bit-slip delay circuit 208-n is adjustable so as to delay the data signal provided from the TX PCS circuit 206-n to the TX PMA circuit 210-n by a controllable number of bits (i.e. by a controllable number of unit intervals). In an exemplary implementation, each TX bit-slip circuit 208-n may be implemented using a barrel shifter circuit.

In a first embodiment, each TX bit-slip delay circuit 208-n may have a granularity of slipping of one bit. In a second embodiment, each TX bit-slip delay circuit 208-n may have a granularity of slipping of two bits. In a third embodiment, each TX bit-slip delay circuit 208-n may have a granularity of slipping of four bits. In a fourth embodiment, each TX bit-slip delay circuit 208-n may have a granularity of slipping of eight bits. More generally, each TX bit-slip delay circuit 108-n may have a granularity of one or more bits.

The granularity of the bit slipping may be selected to satisfy the accuracy (in terms of low skew) of a bonding requirement of a communications protocol. For example, in one hypothetical implementation, the data rate for the serial output from the TX PMA circuit may be 25 Gigabits per second (Gbps) and the maximum skew allowable may be 500 picoseconds. In that case, the maximum skew allowable of 500 picoseconds corresponds to 25 Gbps×500 picoseconds=12.5 unit intervals (UIs). In this case, the bit slip granularity of 8 bits, for example, may be sufficient, since 8 is less than 12.5. Further margin of safety may be obtained at a lower bit slip granularity (for example, a granularity of 4 bits).

Each TX bit-slip delay circuit 208-n of the second embodiment (with 2-bit granularity) provides less accurate (by factor of 2) bonding than the first embodiment (with 1-bit granularity), but it may be implemented (for example, using a barrel shifter circuit) with approximately half the circuit area. Similarly, each TX bit-slip delay circuit 208-n of the third embodiment (with 4-bit granularity) provides less accurate (by factor of 2) bonding than the second embodiment (with 2-bit granularity), but it may be implemented (for example, using a barrel shifter circuit) with approximately half the circuit area. Similarly, each TX bit-slip delay circuit 208-n of the fourth embodiment (with 8-bit granularity) provides less accurate (by factor of 2) bonding than the third embodiment (with 4-bit granularity), but it may be implemented (for example, using a barrel shifter circuit) with approximately half the circuit area.

In accordance with an embodiment of the invention, the bonding control circuit 106 may provide an oversampled data signal to each of the core TX registers 202-n (n=1, 2, ..., N). Further in accordance with an embodiment of the invention, the bonding control circuit 106 may include a skew determiner (skew measurement) circuit 222 that measures latencies of the N lanes based on return data signals received from the N RX registers (Lane n RX Registers) 212-n of the RX circuits 104-n (n=1, 2, ..., N). The latency measurements are used advantageously by the bonding control circuit 106 to generate the TX bit-slip TBS-n and bypass register BR-n control signals so as to compensate for skew between the lanes. In the embodiment of FIG. 2, bypass register control signals BR-1, BR-2, ... BR-N are provided to control inputs of bypass registers 203-1, 203-2, ... 203-N, respectively. The TX bit-slip control signals TBS-1, TBS-2, TBS-N are provided to control inputs of TX bit-slip delay circuits 208-1, 208-2, ... 208-N, respectively.

Figure 3:
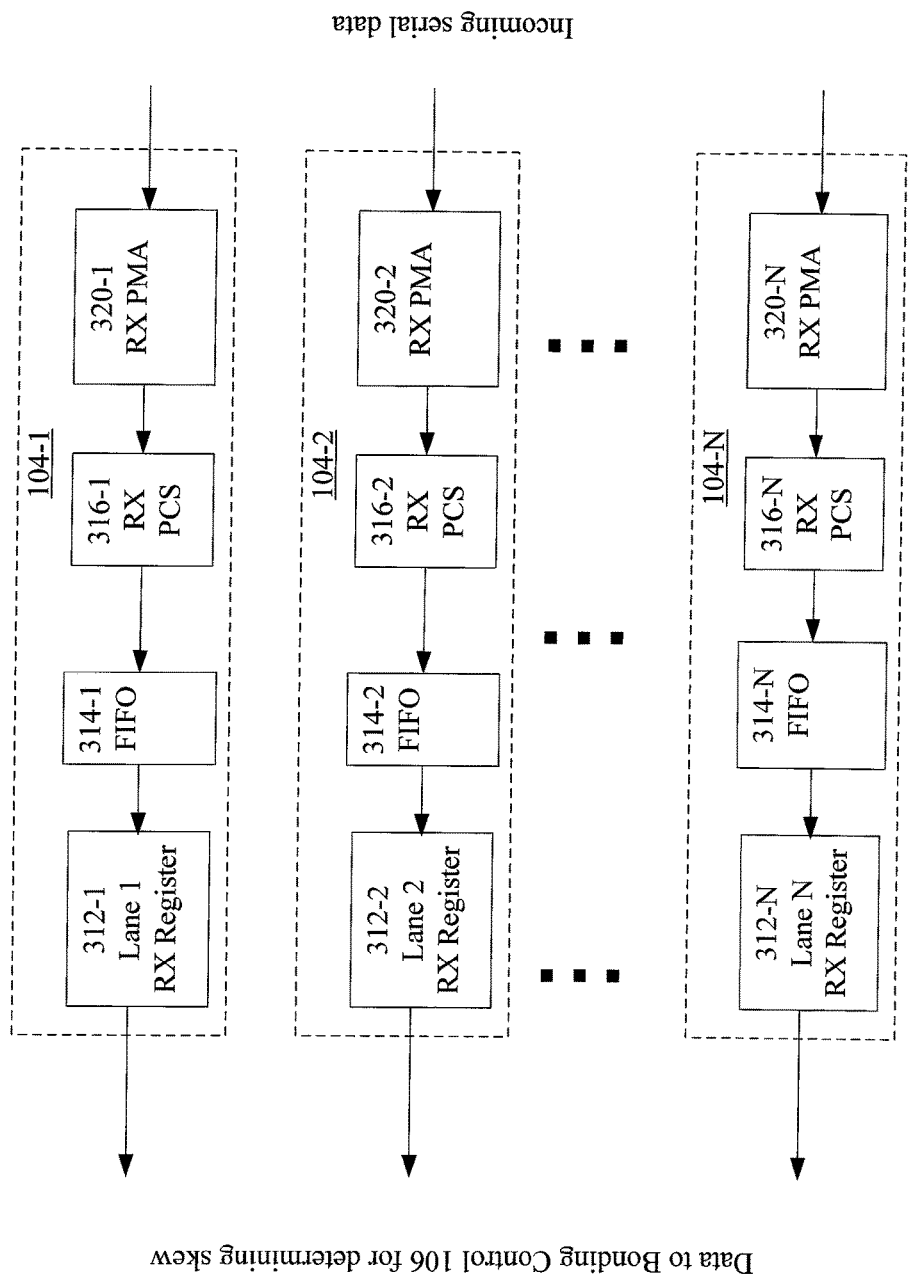
FIG. 3 depicts multiple data receive circuits at the first device in accordance with an embodiment of the invention.

FIG. 3 depicts exemplary data receive circuits (104-1, 104-2, ..., 104-N) at the first device 101 in accordance with an embodiment of the invention. As shown, each data receive circuit 104-$n$ ($n=1, 2, ..., N$) may include: a receive PMA (RX PMA) circuit 320-$n$; a receive PCS (RX PCS) circuit 316-$n$; a phase-compensation FIFO buffer 314-$n$, and a core receive register (Lane n RX Register) 312-$n$.

The RX PMA circuit 320-$n$ (also referred to as a "deserializer" circuit) receives the serialized return data signal via incoming serial lane n 132-$n$. The RX PMA circuit 320-$n$ deserializes the return data signal and provides a parallel data signal to the RX PCS 316-$n$ circuit. The RX PCS circuit (also referred to as a "decoder" circuit) 316-$n$ decodes the parallel data signal and provides the decoded data signal to the phase-compensation FIFO buffer 314-$n$, which provides the buffered data signal to the Lane n RX Register 312-$n$. Note that, in register mode for the return data path, the RX FIFO buffer 314-$n$ is bypassed.

In accordance with an embodiment of the invention, the first device 101 may be configured, during an initialization phase, to loop-back outgoing serial data from each TX PMA 210-$n$ to be bonded so that it is received as incoming serial data by RX PMA 320-$n$. In addition, the first device 101 may be configured, during the initialization phase, so that the returned data from each lane n RX Register 312-$n$ to be bonded is sent to the bonding control circuit 106.

Figure 4:
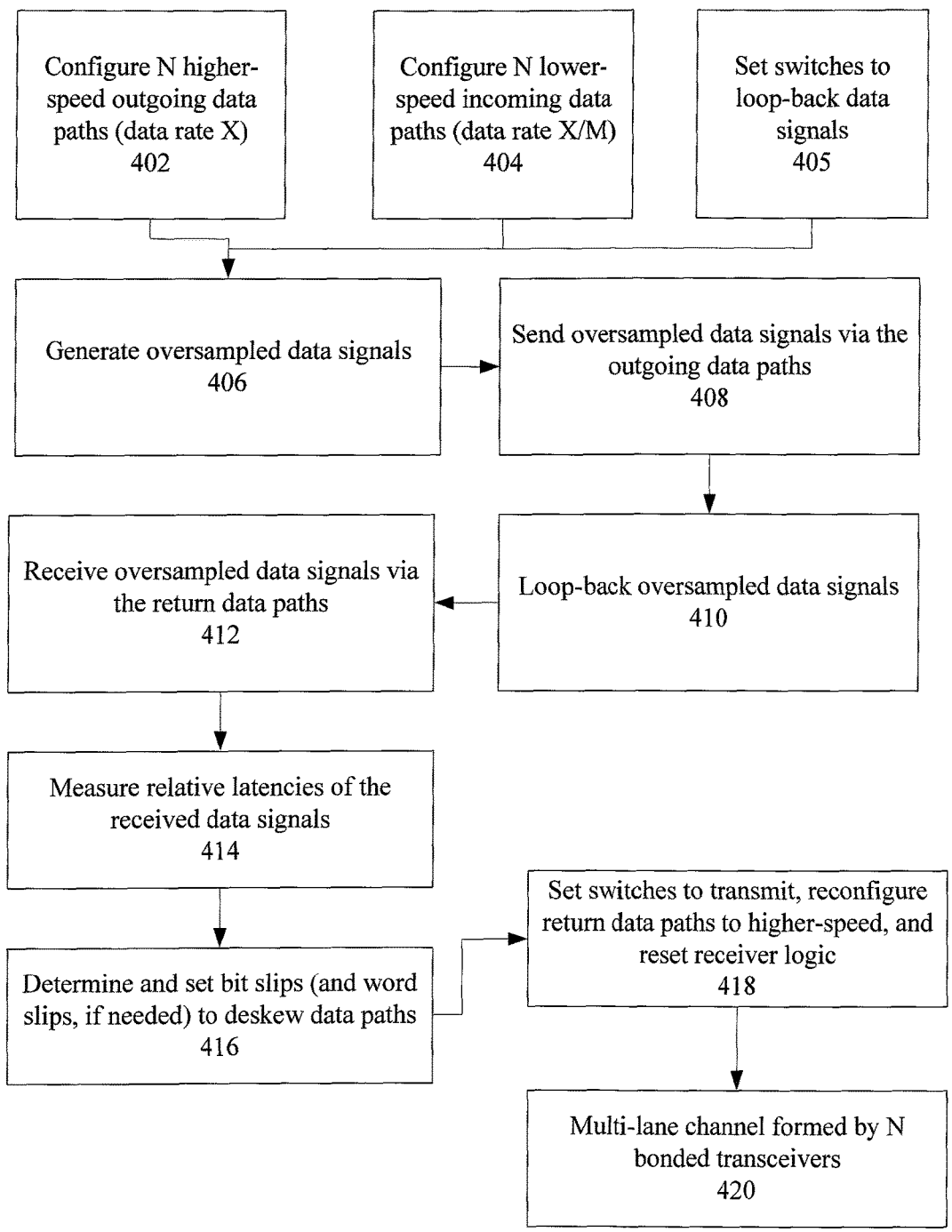
FIG. 4 is a flow chart of a method of low-skew channel bonding using oversampling in accordance with an embodiment of the invention.

FIG. 4 is a flow chart of a method 400 of low-skew channel bonding using oversampling in accordance with an embodiment of the invention. The method 400 may be performed using the circuit apparatus embodiments disclosed herein during an initialization phase of a multi-lane link.

Per step 402, a higher-speed outgoing data path is configured for each of N lanes of a multi-lane link, where N is a number that is two or more. Each outgoing data path corresponds to a transmitter circuit 102 and travels from a transmit register 202-$n$ to a corresponding TX PMA 210-$n$. Configuration step 402 may be performed using the bonding control circuit 106.

Per step 404 (which may be performed in parallel with step 402), a lower-speed return data path in register mode is configured in the first device 101 for each of the N lanes of the multi-lane link. Each return data path corresponds to a receiver circuit 104 and travels from the RX PMA 320-$n$ to the corresponding receive register 312-$n$. Configuration step 404 may be performed using the bonding control circuit 106. In accordance with an embodiment of the invention, the receiver phase-compensation FIFO 314-$n$ is set to register mode for each return data path for the N lanes, and each return data path for the N lanes is configured to have a deterministic latency and a data rate of X/M, where X is the data rate of the higher-speed outgoing data path, and the divisor M is a positive integer that is two or higher. The deterministic latency provides a known and consistent delay for data signals traveling on the return data path. Such a deterministic latency may be achieved by setting the N return data paths to operate in register mode which bypasses phase-compensation FIFO buffers.

Per step 405 (which may be performed in parallel with steps 402 and 404), switches (S) for each of the N lanes of the multi-lane link may be set to a loop-back mode. In the loop-back mode, outgoing data signals sent from a TX PMA 210-$n$ is looped back to a corresponding RX PMA 320-$n$.

Per step 406, N oversampled data signals are each generated from an original data signal. The original data signal may be a user-visible training sequence. In an exemplary implementation, generation of each oversampled data signal involves oversampling every bit of the original data signal M times such that the bit is repeated M times in a row. M is chosen so as to slow down the recovered frequency such that timing reliably be met between the PCS_CLK domain and the CORE_CLK domain with FIFO 204-N being in register mode rather than in FIFO mode.

Per step 408, the N oversampled data signals are sent via the N higher-speed outgoing data paths from the transmit registers 202-$n$ on the first device 101. In an exemplary implementation, the effective data rate of each oversampled data signal is X/M, where X is the (actual) data rate of each oversampled data signal.

Per step 410, each of the N oversampled data signals are looped back to corresponding return data paths. In an exemplary implementation, this is implemented by switches set to a loopback mode such that signals from transmission PMA circuits are looped back to corresponding receiver PMA circuits.

Per step 412, the N oversampled data signals are received via the N return data paths. As described above, each return data path travels from the RX PMA 320-$n$ to the corresponding receive register 312-$n$ on the first device 101.

Per step 414, the skew determiner circuit 222 measures the relative latencies of the N return data signals. Since the return data paths are configured to have deterministic latency, the difference between the latencies corresponds to the skew between the outgoing data paths.

Per step 416, the bonding control circuit 106 determines and sets bit-slip delay control signals (and, optionally, parallel-cycle delay control signals) for multiple lanes being bonded based on the measured latencies in accordance with an embodiment of the invention. An exemplary implementation of step 416 is described below in relation to FIG. 5.

By adjusting the bit slips (and, optionally, word slips) per step 416, the differences in latency between the lanes may be compensated so as to deskew the N outgoing data paths. The bit slips may be performed using the TX bit-slip circuits 208-$n$, or alternatively, clock slip circuits 702-$n$. The word slips may be performed using the bypass registers 203-$n$, or, alternatively, FIFO write or read enable control circuits (802-$n$ or 812-$n$).

Per step 418, the switches may be set to a transmit mode (instead of the loopback mode), the N return data paths may be reconfigured to the higher-speed data rate, and the receiver logic may be reset. The steps described above effectively bonds N transceivers to form a multi-lane channel as shown in box 420.

Figure 5:
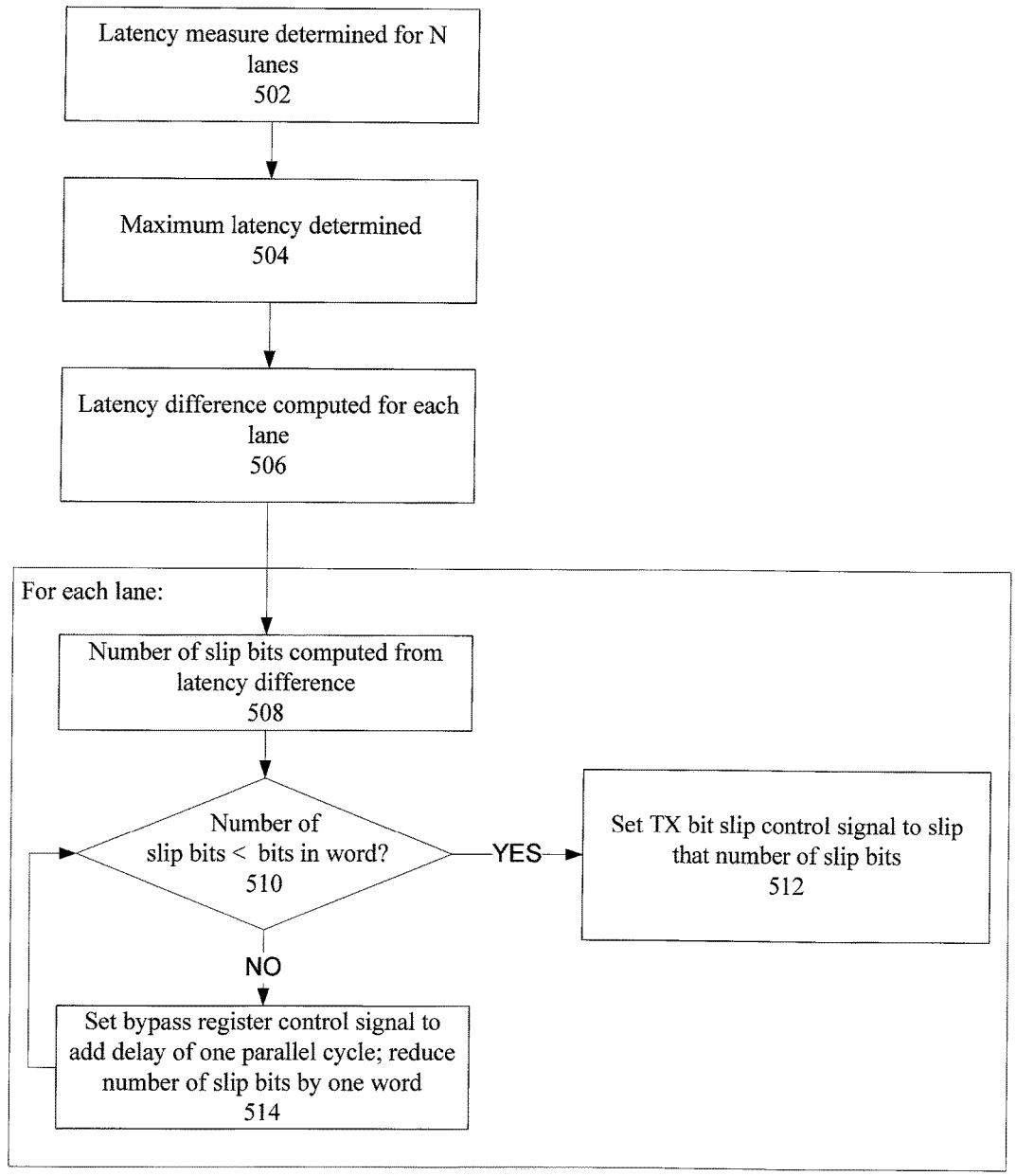
FIG. 5 is a flow chart of an exemplary method of determining bit-slip delay control signals and parallel-cycle delay control signals for multiple lanes being bonded in accordance with an embodiment of the invention.

FIG. 5 is a flow chart of an exemplary method 500 of determining bit-slip delay control signals (TBS-n) and parallel-cycle delay control signals (BR-n) for multiple lanes being bonded in accordance with an embodiment of the invention. While the flow chart of FIG. 5 provides one specific method, other methods may be utilized. This method may, for example, be performed in part by bonding control circuit 106.

Per step 502, a latency measure is determined for each of the N lanes by the skew determiner circuit 222 based on the data from the RX registers 212-$n$.

Per step 504, a maximum latency is determined from amongst the latency measures. The maximum latency may be stored in a maximum latency register.

Per step 506, the difference between each latency measure and the maximum latency may be computed for each lane. The latency difference for each lane may be stored in corresponding latency difference registers.

Per step 508, for each lane, a number of bits to slip may be determined from the latency difference. The bits slips may be determined such that the total propagation delay for the outgoing data path is the same across all lanes.

A determination may be made, per step 510, as to whether or not the bit slip for a lane is less than the width in bits of the lane. If the bit slip for the lane (lane n) is less than the width of the lane, then the TX bit-slip control signal (TBS-n) for that lane may be set, per step 512, so that TX bit-slip delay circuit 208-$n$ slips the bits by the number of bits to slip that was determined for the lane in step 508. On the other hand, if the bit slip for the lane is greater than or equal to the width in bits of the lane, then the bypass register control signal (BR-n) for that lane may be set (or the FIFO depth adjusted), per step 514, to add a parallel cycle delay and the number of bits to slip for that lane may then be reduced by one lane width (i.e. one word) of bits using, for example, bypass register 203-$n$ or an enable control circuit that receives signal BR-n. After step 514, the method 500 may loop back to step 510.

Alternate Embodiments

Figure 6:
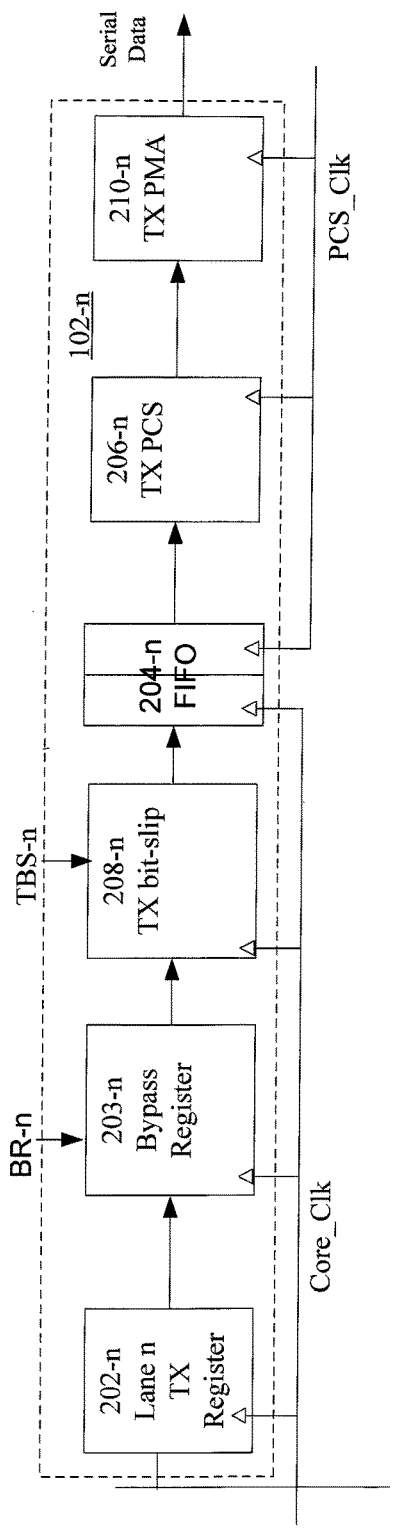
FIG. 6 depicts a structure for the data transmit circuit at the first device in accordance with a first alternate embodiment of the invention.

FIG. 6 depicts a structure for the data transmit circuit 102-$n$ at the first device 101 in accordance with a first alternate embodiment of the invention. In this embodiment, the TX bit-slip circuits 208-$n$ are located before the corresponding FIFOs 204-$n$ in each lane n (n=1, 2, . . . , N). In this embodiment, the Core_Clk clock signal is provided to the core registers 202-$n$, the bypass registers 203-$n$, the TX bit-slip delay circuits 208-$n$, and the FIFO registers 204-$n$, while the PCS_Clk clock signal is provided to the FIFO registers 204-$n$, the PCS circuits 206-$n$, and the PMA circuits 210-$n$.

Figure 7:
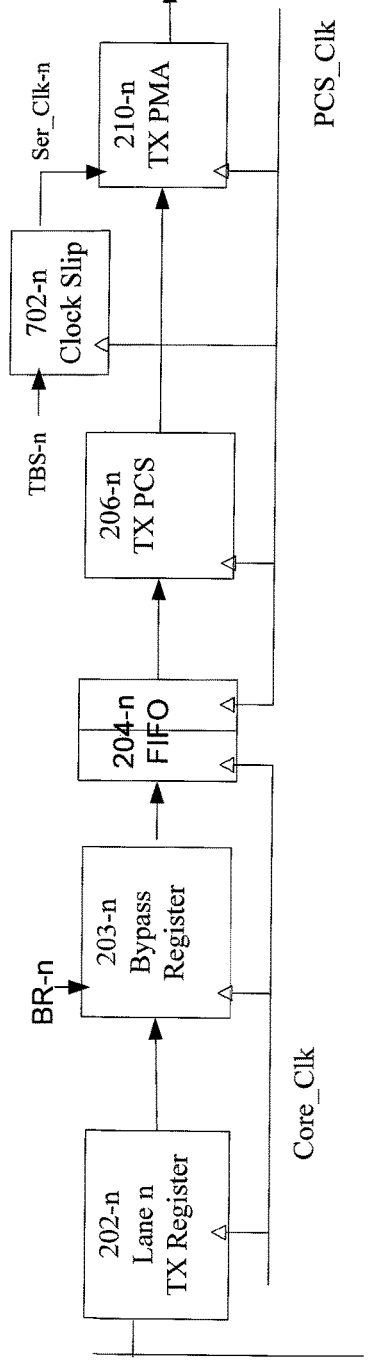
FIG. 7 depicts a structure for the data transmit circuit at the first device in accordance with a second alternate embodiment of the invention.

FIG. 7 depicts a structure for the data transmit circuit 102-$n$ at the first device 101 in accordance with a second alternate embodiment of the invention. In this embodiment, instead of implementing the bit slipping in lane n by TX bit-slip circuit 208-$n$, the bit slipping is effectively implemented by clock slip circuit 702-$n$ that controllably slips the parallel clock signal (PCS_Clk) by an integer number of unit intervals of the serial clock signal, and provides the slipped clock signal (Ser_Clk-n) to the clock input of the PMA circuit 210-$n$.

In this embodiment, the PMA circuit 210-$n$ combined with the bypass register 203-$n$ for lane n may be used to adjust the propagation delay from the output of the core TX register 202-$n$ to the output of the PMA circuit 210-$n$ for that lane. The combined delay is adjusted using the bypass register (BR-n) control signal and the TX bit-slip (TBS-n) control signal. In this case, the TX bit-slip control signals may be referred to as clock-slip control signals.

In this embodiment, the Core_Clk clock signal is provided to the core register 202-$n$, the bypass registers 203-$n$, and the FIFO registers 204-$n$, while the PCS_Clk clock signal is provided to the FIFO registers 204-$n$, the PCS circuits 206-$n$, the clock slip circuits 702-$n$, and the PMA circuits 210-$n$.

Figure 8A:
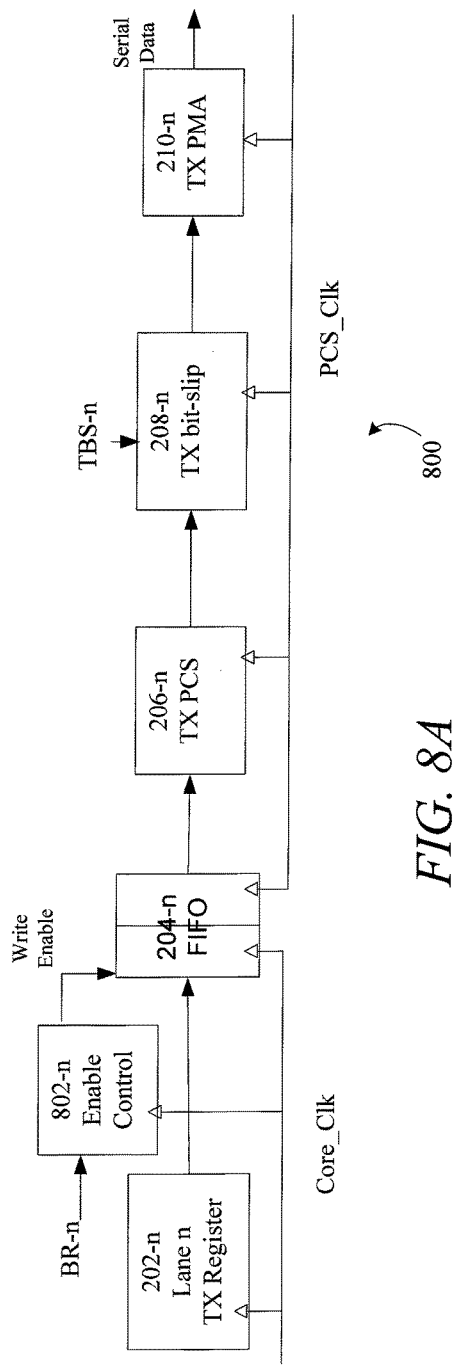
FIG. 8A depicts a structure for the data transmit circuit at the first device in accordance with a third alternate embodiment of the invention.

FIG. 8A depicts a structure for the data transmit circuit 102-$n$ at the first device 101 in accordance with a third alternate embodiment of the invention. In this embodiment, instead of using bypass register 203-$n$ to slip whole words, the write enable signal to the FIFO circuits 204-$n$ are controlled by control circuit 802-$n$ to achieve the same result. The write enable signal is controlled to effectively adjust depth of the FIFO circuit 204-$n$ so as to controllably a slip whole word (or not) depending on the BR-n signal from the bonding control circuit 106. The BR-n signal is provided to a control input of control circuit 802-$n$ in this embodiment.

Figure 8B:
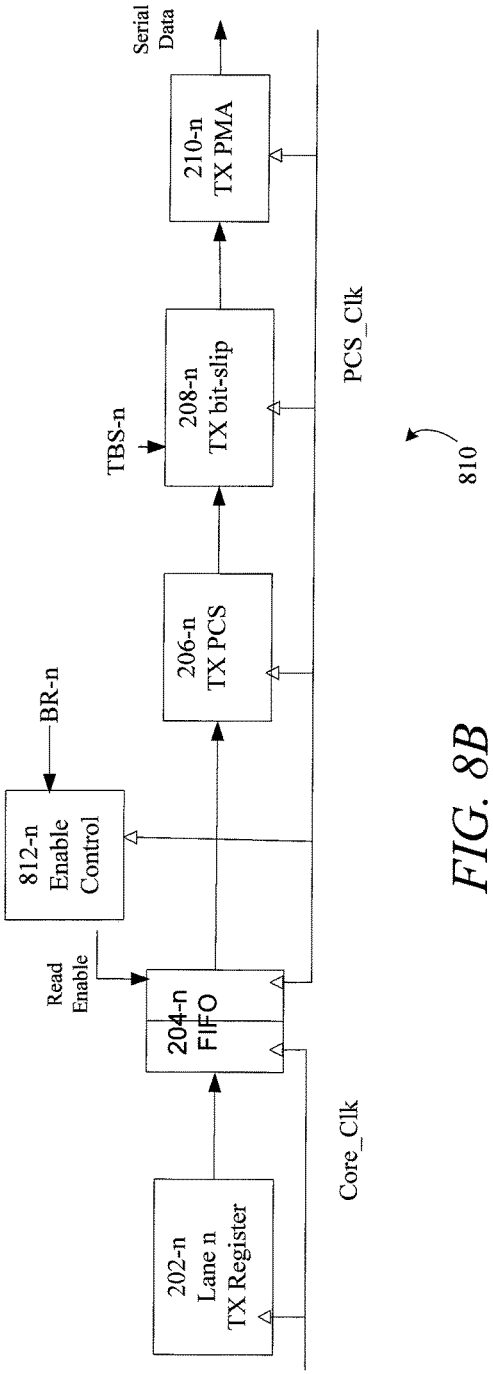
FIG. 8B depicts a structure for the data transmit circuit at the first device in accordance with a fourth alternate embodiment of the invention.

FIG. 8B depicts a structure for the data transmit circuit 102-$n$ at the first device 101 in accordance with a fourth alternate embodiment of the invention. In this embodiment, instead of using bypass register 203-$n$ to slip whole words, the read enable signal to the FIFO circuits 204-$n$ are controlled by control circuit 812-$n$ to achieve the same result. The read enable signal is controlled to effectively adjust depth of the FIFO circuit 204-$n$ so as to controllably a slip whole word (or not) depending on the BR-n signal from the bonding control circuit 106. The BR-n signal is provided to a control input of control circuit 812-$n$ in this embodiment.

Exemplary Integrated Circuit and Exemplary System

Figure 9:
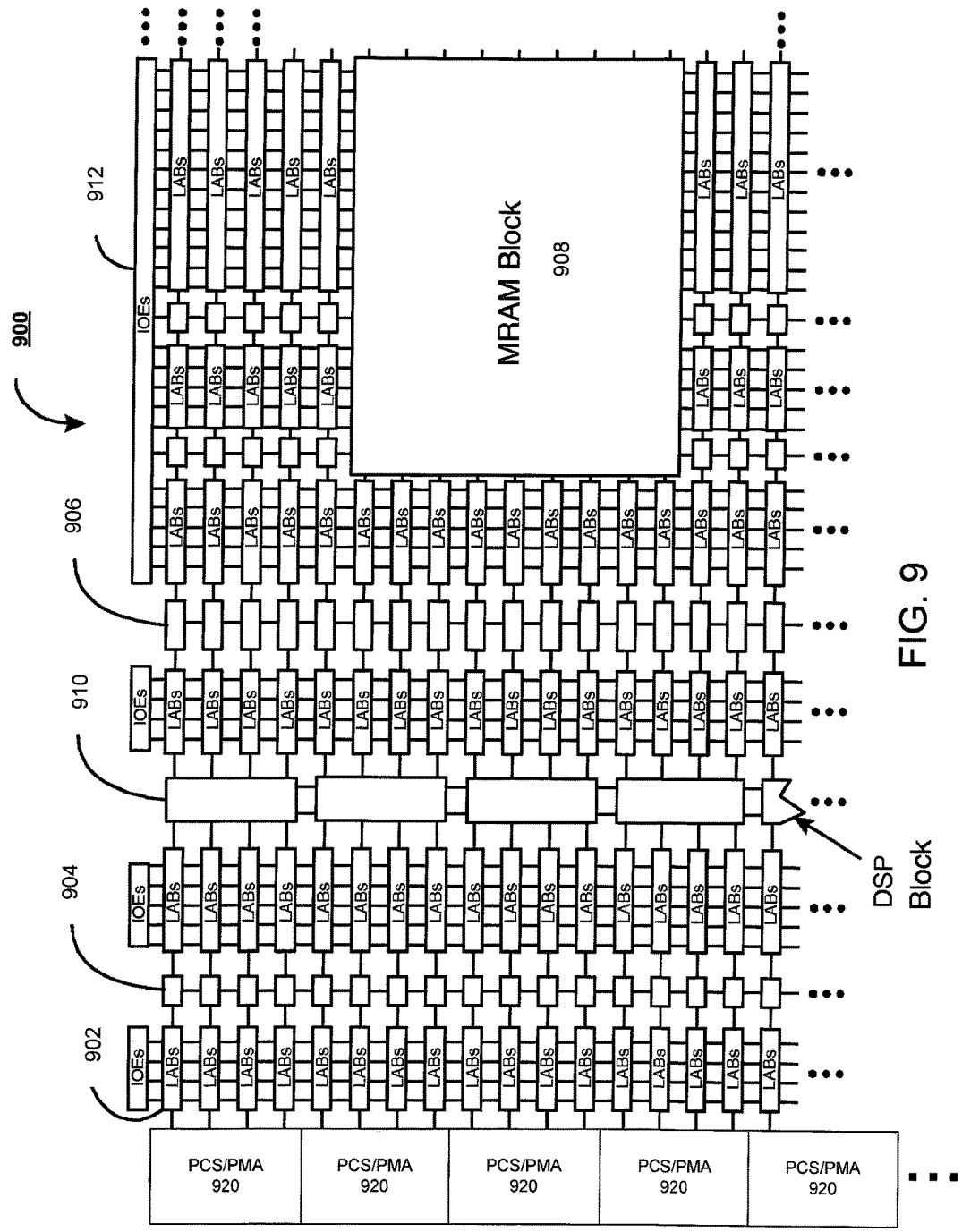
FIG. 9 is a simplified partial block diagram of an exemplary field programmable gate array (FPGA) that may be configured to implement an embodiment of the present invention.

FIG. 9 is a simplified partial block diagram of an exemplary field programmable gate array (FPGA) 10 that may be configured to implement an embodiment of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs). A LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. One or more embedded CPUs (not shown) may also be included in the FPGA. Input/output elements (IOEs) 22 located, in this example, around the periphery of the chip support numerous single-ended and differential input/output standards. Each IOE 22 is coupled to an external terminal (i.e., a pin) of FPGA 10.

Physical coding sublayer (PCS) 29 and physical medium attachment (PMA) 30 modules may be arranged as shown, for example, with each PCS module 29 being coupled to several LABs. Each PMA module 30 may be communicatively coupled to a corresponding PCS module 29 and may include analog (and digital) circuitry to implement one or more transceiver channels.

It is to be understood that FPGA 10 is described herein for illustrative purposes only and that the present invention can be implemented in many different types of PLDs, FPGAs, and ASICs.

Figure 10:
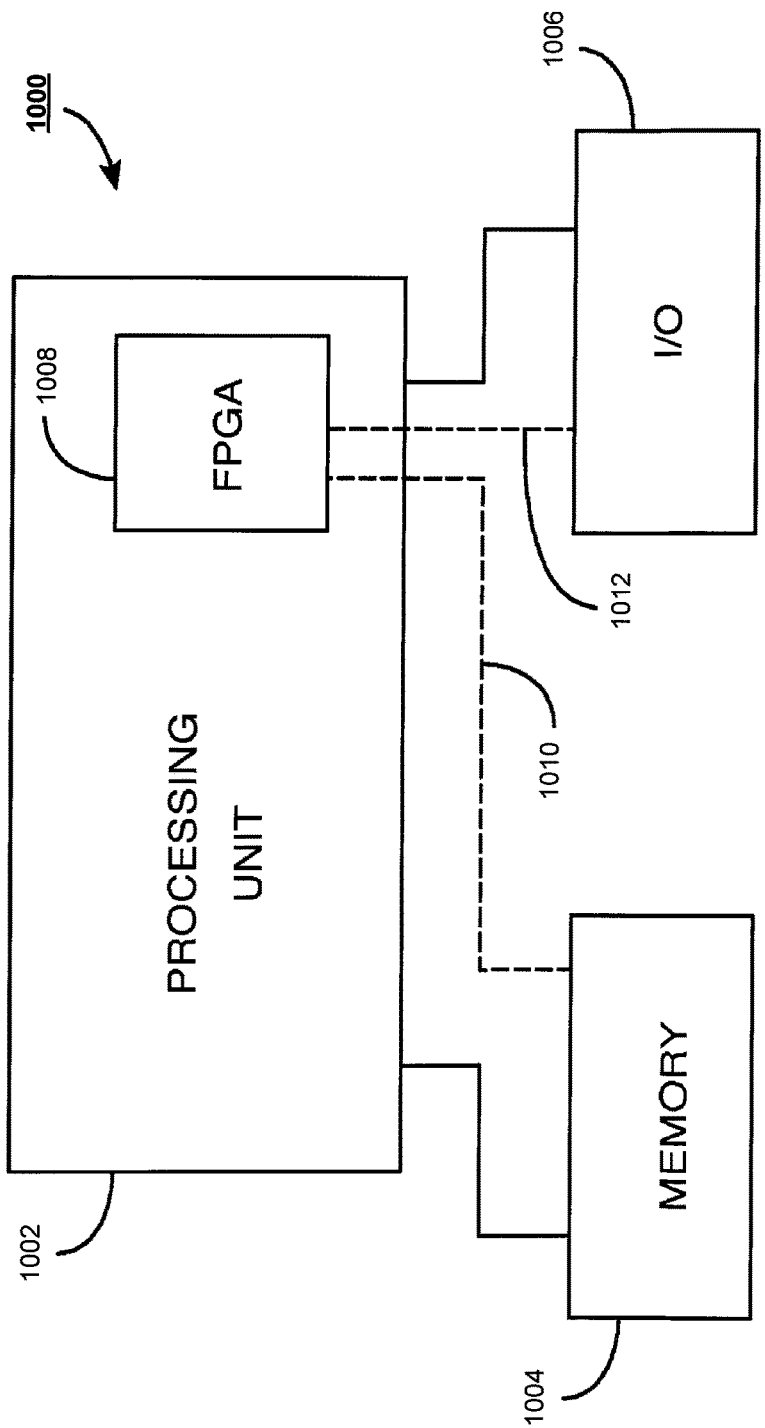
FIG. 10 shows a block diagram of an exemplary digital system that may employ apparatus and methods as disclosed herein.

FIG. 10 shows a block diagram of an exemplary digital system 50 that may employ techniques disclosed herein.

System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method of bonding of a plurality of serial data channels, the method comprising:
   generating a plurality of oversampled data signals in a device;
   sending the plurality of oversampled data signals over a plurality of outgoing data paths of the device;
   looping back the oversampled data signals to a plurality of return data paths of the device;
   receiving the oversampled data signals as return data signals over the plurality of return data paths, wherein the plurality of return data paths are configured at a slower-speed than the plurality of outgoing data paths;
   measuring latencies of the return data signals;
   determining latency differences between said measured latencies;
   determining a plurality of bit slips based on the latency differences; and
   applying the plurality of bit slips to the plurality of outgoing data paths to compensate for the latency differences.

2. The method of claim 1, further comprising:
   configuring the plurality of outgoing data paths to each operate at a first data rate; and
   configuring the plurality of return data paths to each operate at a second data rate, wherein the second data rate is M times slower than the first data rate.

3. The method of claim 2, wherein the plurality of oversampled data signals are generated by oversampling a training data signal by M times, where M is positive integer greater than one.

4. The method of claim 2, further comprising:
   further configuring the plurality of return data paths to each be in a register mode that bypasses phase-compensation first-in first-out buffers and to each have a deterministic latency.

5. The method of claim 4, further comprising:
   after applying the plurality of bit slips, re-configuring the plurality of return paths to each operate at the first data rate in a phase-compensation mode, and resetting receiver logic on the device.

6. The method of claim 1, further comprising:
   generating a plurality of bit-slip control signals.

7. The method of claim 6, further comprising:
   using the plurality of bit-slip control signals to control a plurality of transmitter bit-slip delay circuits.

8. The method of claim 6, further comprising:
   using the plurality of bit-slip control signals to control a plurality of clock slip circuits which provide clock signals to a plurality of serializers.

9. The method of claim 6, further comprising:
   generating a plurality of word-slip control signals.

10. The method of claim 9, further comprising:
    using the plurality of word-slip control signals to control a plurality of bypass register circuits.

11. The method of claim 9, further comprising:
    using the plurality of word-slip control signals to control enable signals for first-in first-out buffer circuits.

12. The method of claim 1, wherein the method is performed during an initialization phase of a multi-lane channel formed from the plurality of serial data channels.

13. An integrated circuit device comprising:
    a plurality of transmitter circuits that send a plurality of oversampled data signals;
    a plurality of receiver circuits that receive a plurality of return data signals;
    a bonding control circuit for controlling the plurality of transmitter circuits and the plurality of receiver circuits, the bonding control circuit performing steps that include
       setting a plurality of switches to loop-back outgoing data signals from the plurality of transmitter circuits to the plurality of receiver circuits,
       generating a plurality of oversampled data signals and providing the plurality of oversampled data signals to the plurality of transmitter circuits, measuring latencies of the plurality of return data signals, determining latency differences between said measured latencies, determining a plurality of bit slips based on the latency differences, and applying the plurality of bit slips to the plurality of transmitter circuits to compensate for the latency differences.

14. The integrated circuit device of claim 13, wherein the plurality of oversampled data signals are generated by oversampling a training data signal by M times, where M is positive integer greater than one.

15. The integrated circuit device of claim 14, wherein the bonding control circuit performs further steps including:

configuring the plurality of transmitter circuits to each operate at a first data rate; and configuring the plurality of receiver circuits to each operate at a second data rate, wherein the second data rate is M times slower than the first data rate.

16. The integrated circuit device of claim 15, wherein the bonding control circuit further configures the plurality of receiver circuits to each be in a register mode that bypasses a phase-compensation first-in first-out buffer and to each have a deterministic latency.

17. The integrated circuit device of claim 16, wherein the bonding control circuit, after applying the plurality of bit slips, re-configures the plurality of receiver circuits to each operate at the first data rate in a phase-compensation mode, and resets receiver logic for the receiver circuits.

18. A system for bonding of a plurality of serial data channels, the system comprising:

a plurality of serial channels which include a plurality of transmitter circuits and a plurality of receiver circuits; and a bonding control circuit that controls the plurality of transmitter circuits and the plurality of receiver circuits during an initialization phase to bond the plurality of serial channels to form a multi-lane channel, the bonding control circuit performing steps that include generating a plurality of oversampled data signals in a device, sending the plurality of oversampled data signals from the plurality of transmitter circuits, looping back the plurality of oversampled data signals to the plurality of receiver circuits, receiving the plurality of oversampled data signals as return data signals by the plurality of receiver circuits, measuring latencies of the return data signals, determining latency differences between said measured latencies, determining a plurality of bit slips based on the latency differences, and applying the plurality of bit slips to the plurality of transmitter circuits to compensate for the latency differences.

19. The system of claim 18, wherein the bonding control circuit performs further steps including configuring the plurality of transmitter circuits to each operate at a first data rate, and configuring the plurality of receiver circuits to each operate at a second data rate, wherein the second data rate is M times slower than the first data rate, where M is a positive integer greater than one.

20. The system of claim 19, wherein the plurality of oversampled data signals are generated by oversampling a training data signal by M times.

* * * * *